United States Patent

Oshiro

[15] 3,671,876

[45] June 20, 1972

[54] PULSE-PHASE COMPARATORS

[72] Inventor: George S. Oshiro, P.O. Box 90876, Los Angeles, Calif. 90009

[22] Filed: Jan. 19, 1971

[21] Appl. No.: 107,724

[52] U.S. Cl. ................................328/134, 307/215, 307/216
[51] Int. Cl. ........................................................H03d 13/00
[58] Field of Search ....................307/216, 215; 328/94, 133, 328/134, 141

[56] References Cited

UNITED STATES PATENTS

| | | | |
|---|---|---|---|
| 2,878,448 | 3/1959 | Maxey | 328/134 X |
| 3,054,062 | 9/1962 | Vonarburg | 328/134 X |
| 3,064,189 | 11/1962 | Erikson et al. | 328/134 X |
| 3,328,688 | 6/1967 | Brooks | 328/133 X |
| 3,391,343 | 7/1968 | McCurdy | 328/133 |
| 3,543,167 | 11/1970 | Albarda | 328/133 |

*Primary Examiner*—John S. Heyman

[57] ABSTRACT

The device disclosed herein is a pulse-phase comparator of a digital nature possessing a high degree of noise immunity due to the complete absence of triggerable elements such as binaries or one-shoe multivibrators, and featuring a mode of operation wherein a null output is defined by a corresponding in-phase condition of the compared input signals by virtue of the insertion of additional and externally-generated pulse signals whose fundamental-frequency and phasing character bears a fixed relationship to that of one of the compared signals.

8 Claims, 8 Drawing Figures

FIG. 1

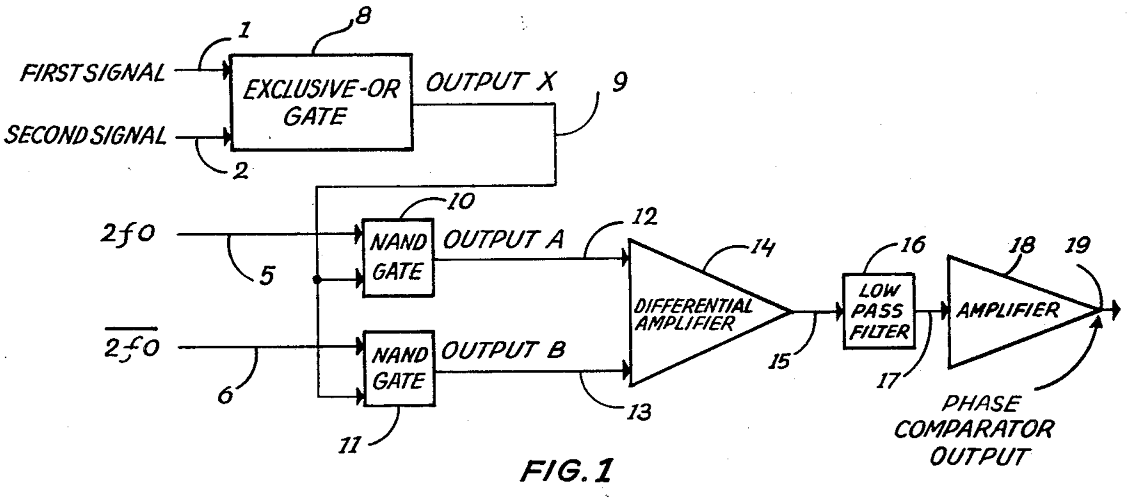
FIG. 1
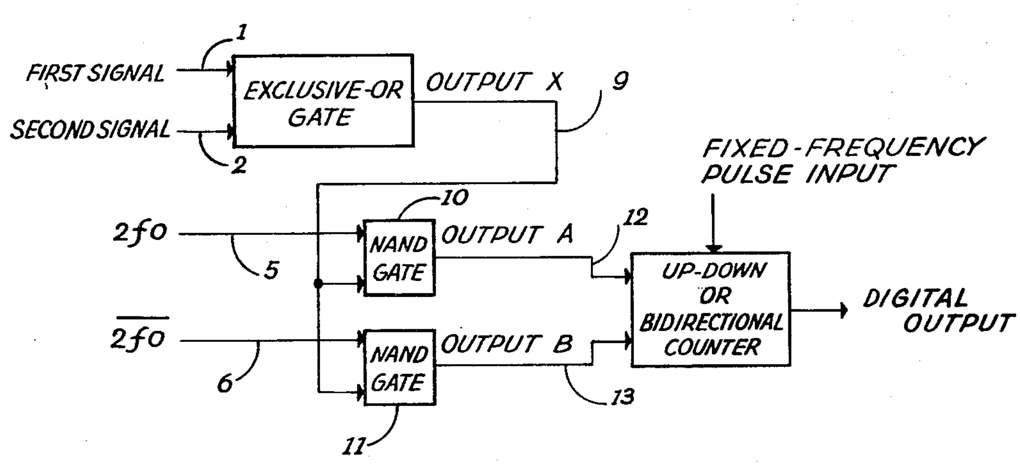
FIG. 2
TRUTH TABLE
| FIRST SIGNAL | SECOND SIGNAL | OUTPUT X | 2fo | $\overline{2fo}$ | OUTPUT A | OUTPUT B | OUTPUT CONDITION |
|---|---|---|---|---|---|---|---|
| 1 | 0 | 1 | 0 | 1 | 1 | 0 | OFF-NULL |
| 0 | 1 | 1 | 1 | 0 | 0 | 1 | OFF-NULL |
| 1 | 1 | 0 | 0 | 1 | 1 | 1 | NULL |
| 0 | 0 | 0 | 1 | 0 | 1 | 1 | NULL |
FIG. 3
INVENTOR
George S. Oshiro INVENTOR
George S. Oshiro

PULSE-PHASE COMPARATORS

This invention relates in general to phase comparators that are used in deriving an indication of the phase difference existing between two signals which are substantially of the same frequency. More specifically, this invention contemplates a pulse-phase comparator predicated upon a novel harmonic-gating concept whose basic construction and mode of operation were first disclosed in an article authored by this inventor in the trade journal ELECTRONIC DESIGN, Vol. 18, No. 3, published on Feb. 1, 1970.

Although exponents within the signal processing field have taken considerable advantage of the inherent precision and reliability of phase-comparison techniques, the application of phase comparators has been predominantly restricted to the analog signal processing area. Despite the vast potential of phase-comparison techniques in digital signal processing, their incorporation in this area has been, thus far, extremely minimal. A significant factor in prohibiting the expanded utilization of phase-comparison methods in digital systems is that presently available digital pulse-phase comparators are virtually inoperable in the presence of electrical noise. The latter inadequacy makes the use of currently available digital pulse-phase comparators untenable in most communications and control systems. A prime feature, therefore, of the present invention is its dual capability of providing (1) means for obtaining completely digital pulse-phase comparison with substantial noise immunity and (2) means by which noise-immune digital pulse-phase comparison is effected with the attendant advantages of the digital approach such as improved accuracy and control while maintaining compatibility with analog applications.

For the purpose of facility, the use of the term "pulse" is intended herein to apply to a signal compatible with solid-state digital logic circuit elements unless indicated differently. This latter convenience, however, is not to be construed as violating the broader scope of the appended claims when pulse signals, characterized in a more generic sense than prior indicated, necessitate the use of other circuit elements, the working aggregate of which falls within the framework of said claims. Conversely, then, the term "logic" shall apply to any circuit element, or groups thereof, capable of digitally operating on a pulse signal of the type just described.

In perspective of the broad description given to the invention and some of its features, the specific object of this invention is to provide an apparatus, which is inherently and reliably operable in an electrically noisy environment, in the form of a novel pulse-phase comparator (1) capable of providing pulse-phase comparison without the use of triggered elements, (2) capable of producing an accurate digital representation of the phase difference between two pulse signals, (3) capable of accepting, in addition to the two inputs to be compared, other pulse inputs harmonically related to one of the said inputs for purposes of digitally controlling the mode and the effective range of pulse-phase comparison, (4) capable of producing a zero-volt dc output or a digital null indication when the two pulse inputs to be compared are in phase, (5) of extremely simple and reliable construction utilizing integrated circuit elements, and (6) characterized by a substantial immunity to the effects of temperature drift.

The aforementioned and other objects and advantages of this invention become apparent and more readily understood when consideration is given to the following description along with the accompanying drawings wherein:

FIG. 1 is a schematic diagram illustrating the construction of the preferred embodiment of this invention;

FIG. 2 is a schematic diagram illustrating the construction of an alternate embodiment of this invention;

FIG. 3 is a logic truth table defining the logical properties common to both of said embodiments as illustrated in FIG. 1 and in FIG. 2;

Figure 4A:
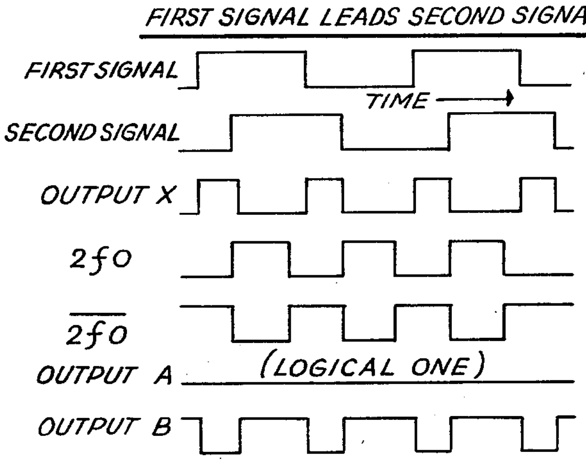
FIG. 4 is a diagram comprising sets of voltage waveforms useful in understanding the present invention.

Referring now to the preferred embodiment as illustrated in FIG. 1 or the alternate embodiment as illustrated in FIG. 2, the EXCLUSIVE-OR gate 8 receives the FIRST SIGNAL and the SECOND SIGNAL on lines 1 and 2, respectively. Assume for the moment that the latter signals are symmetrical in their waveform structure in the in the interest of clarity. The OUTPUT X of the EXCLUSIVE-OR gate is presented on a common line 9 to NAND gates 10 and 11 which further receive respective signals $2fo$ and $\overline{2fo}$ on lines 5 and 6, respectively. The logical properties defining the operation of said NAND gates and said EXCLUSIVE-OR gate with respect to the aforementioned signals and the resulting logic signals, OUTPUT A and OUTPUT B, are presented in the truth table of FIG. 3. It is seen that OUTPUT X as shown in FIG. *4a* has a pulse width equal to the difference in phase existing between the FIRST SIGNAL and the SECOND SIGNAL. OUTPUT X, however, merely signifies the magnitude of the said phase difference without any indication as to the polarity of same, the polarity being related to the leading or lagging nature of the FIRST SIGNAL with respect to the SECOND SIGNAL. This ambiguous condition is remedied in novel and simple manner by gating OUTPUT X with pulse signals $2fo$ and its logical complement, $\overline{2fo}$, as shown in FIG. 1. The frequency of the latter two signals are made to be exactly twice that of the SECOND SIGNAL. Thus, $2\ fo$ and $\overline{2fo}$ form second harmonics of the SECOND SIGNAL. It can then be seen, by referring to FIG. 4a and the truth table of FIG. 3, that when OUTPUT X occurs in time-coincidence with $\overline{2fo}$, it is presented in inverted form as OUTPUT B. OUTPUT B is now capable of simultaneously indicating magnitude as well as polarity of the said phase difference since the existence of two separate outputs can be used, in this case, to define one with respect to the other. Note that OUTPUT A remains static in it level. A similar explanation applies for the waveforms as seen in FIG. *4b*. In the latter, OUTPUT A is in the form of pulses, whereas OUTPUT B remains static in level as a result of the FIRST SIGNAL, in this case, lagging the SECOND SIGNAL.

Means are now established to utilize the information contained in OUTPUT A and OUTPUT B. The present invention utilizes two approaches in extracting the above information: a bidirectional counter technique shown in FIG. 2 illustrating the alternate embodiment of this invention; and a differential-voltage technique as shown in FIG. 1 illustrating the preferred embodiment of this invention. Returning now to the detail operational description of the preferred embodiment, an integrated circuit (IC) operational amplifier 14 such as the Radiation Incorporated RA2600 device is connected to lines 12 and 13 to receive OUTPUT A and OUTPUT B, respectively. It should be understood that a suitable differential element may be substituted in place of the said operational amplifier without departing from the functional scope of the said differential-voltage technique. The differential configuration of an operational amplifier is aptly described in a Burr-Brown Research Corporation publication titled HANDBOOK OF OPERATIONAL AMPLIFIER APPLICATIONS, pages 20 through 23. Since the differential amplifier is connected to lines 12 and 13 in such a manner as to extract a voltage proportional to the voltage difference between OUTPUT A and OUTPUT B, respectively, its output is bipolar in nature and indicative simultaneously of the polarity and magnitude of the phase difference existing between said FIRST SIGNAL and said SECOND SIGNAL. The differential amplifier output signal 15 appears as pulses having positive or negative excursions about a zero-volt signal base line. The sign of the excursions depends on the leading or lagging nature of the FIRST SIGNAL with respect to the SECOND SIGNAL.

Figure 4C:
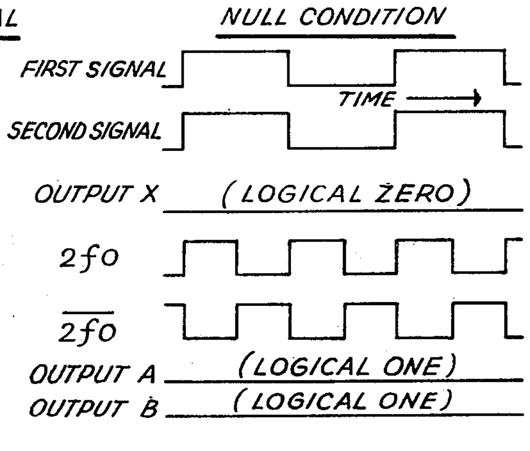
Figure 4B:
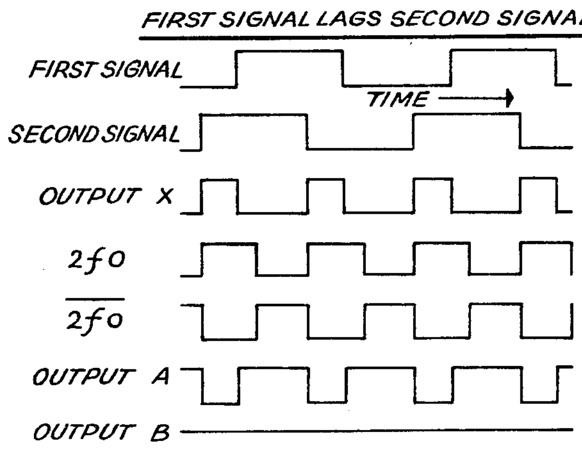

The output pulses of the differential amplifier 14 remain essentially digital in nature insofar as speed of voltage transitions is concerned but are incompatible with most logic elements. This incompatibility is of no consequence since a low-pass filter 16 is utilized to derive the substantially dc component of the differential output. The output 17 of the low-pass fiter is essentially analog in nature and proportional in amplitude to the said phase difference and has a polarity dependent on whether the FIRST SIGNAL leads or lags the SECOND SIGNAL. Although the inclusion of an additional amplifier 18 is not necessary in many cases wherein the low-pass fiter output is directly usable, it, nevertheless, proved to be convenient in one particular application of the preferred embodiment of this invention which is later described. Again, an operational amplifier was chosen as a preferred circuit element in the form of the Radiation Incorporated RA2600 device. The use of an operational amplifier as an ordinary amplifier inherently provides a summing capability as an additional tool which is taken advantage of in the application just mentioned. The null state, corresponding to an in-phase condition existing between the FIRST SIGNAL and the SECOND SIGNAL, is indicated by a zero-volt dc output from the amplifier 18. The null state is characterized by the set of waveforms labeled NULL CONDITION as shown in FIG. 4*c*. An off-null state is indicated by either a positive or negative dc voltage output from said amplifier 18 and corresponds to the set of waveforms labeled FIRST SIGNAL LEADS SECOND SIGNAL as shown in FIG. 4a and to the set of waveforms labeled FIRST SIGNAL LAGS SECOND SIGNAL as shown in FIG. 4*b*.

A powerful and unique feature of the phase comparator described in the foregoing is its substantial immunity to relatively high frequency noise pulses appearing on the same line as the FIRST SIGNAL. This can be explained by the fact that the said noise pulses occur, on an average, equally as much in coincidence with $2fo$ as with $\overline{2fo}$. As a result, a practical and effective cancellation of said noise pulses takes place as the diffential amplifier output, including the said noise pulses, is filtered to pass mainly the signal component representing the information contained in the phase difference existing between the FIRST SIGNAL and the SECOND SIGNAL. Thus, the phase comparator described offers a phenomenon much like common mode rejection to noise signals present on a single line, whereas, normally, said rejection is only possible with two input lines carrying common-mode noise pulses and being treated differentially at the points of input.

Another practical consideration of the preferred practice of the novel pulse-phase comparator presented herein is the use of said NAND gates which are commercially manufactured on the same integrated circuit chip to yield a performance tracking quality that makes the phase-comparison operation virtually immune to temperature effects. Additionally, since the preferred construction involves a differential treatment of signals representing phase difference as previously indicated, effects of logic power supply variations are also practically nullified.

At this juncture of the device description, those skilled in the art may begin to realize that columns representing OUTPUT A and OUTPUT B in the the truth table of FIG. 3 can be modified by replacing logical ones (1's) with logical zeros (0's), and vice versa, by the incorporation of suitable inversion elements or other logic circuits, such as AND gates in place of said NAND gates and, at the same time, replacing the said EXCLUSIVE-OR gate with an EXCLUSIVE-NOR gate, without departing from the intended scope of the phase comparator as embodied in this invention. The preceding statement holds true as long as the modifications thereby effected can be ultimately defined and reduced in terms of operation by and to the logical states, or logical complements thereof, and signals as presented and described in the truth table of FIG. 3 and other portions of this specification. Those skilled in the art may further appreciate the unique digital control capability afforded by the concept of harmonic gating occurring at the NAND gates used in the preferred embodiment. This capability can be extended to vary the range of phase comparison or the degree of noise rejection by additionally gating into said NAND gates, along with $2fo$ and $\overline{2fo}$, higher frequency pairs of pulse harmonics related to the said SECOND SIGNAL. Thus, this latter extension of the harmonic-gating concepts amounts to a process that can be effectively described as digital fine tuning.

In the alternate embodiment of this invention, the information contained in OUTPUT A and OUTPUT B is extracted by means of a bidirectional counter 22 in FIG. 2 as previously mentioned. The mechanics of the operation of bidirectional counters is well known throughout the art and will not be discussed in detail. The application of a bidirectional counter in the said embodiment of the present invention involves the counting of relatively high frequency pulses (fixed in frequency) in an increasing manner whenever OUTPUT B appears, or, in dereasing manner whenever OUTPUT A appears. The manner of counting just described may be reversed to suit the particular application. The resultant digital count indication is directly proportional to the phase difference existing between the FIRST SIGNAL and the SECOND SIGNAL. The said digital count indication can be utilized to actuate or control other digital apparatuses such as digital computers or similar digital processors. Substantial noise immunity is again achieved, as in the case of the preferred embodiment, due to the fact that noise pulses present on the same line as the FIRST SIGNAL occur, on an average, equally as much in coincidence with $2fo$ as with $\overline{2fo}$. Thus, the average digital output indication of the phase difference between the FIRST SIGNAL and the SECOND SIGNAL remains relatively unperturbed by said noise pulses. A potentially significant use of the alternate embodiment of this invention lies in the construction of all-digital phase-lock loops whose general development has been quite sluggish due, in part, to the lack of a suitable digital pulse-phase comparator. Although the detail application of the said alternate embodiment of this invention within the area of all-digital phase-lock loops is not discussed here, an excellent article by Edwin M. Drogin dealing with the general principles on which the design of all-digital phase-lock loops are based can be found in the trade journal ELECTRONICS, Vol. 40, No. 24, Nov. 27, 1967, pages 95 through 102.

Figure 5:
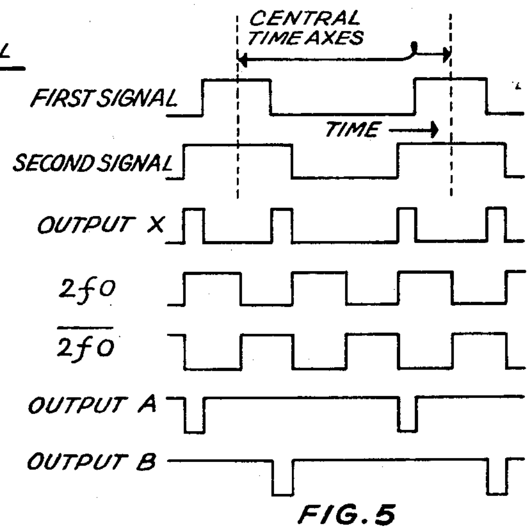
FIG. 5 is a diagram comprising an additional set of voltage waveforms useful in understanding the present invention.

The foregoing description of the circuit operation of the preferred and alternate embodiments of this invention assumed that both the FIRST SIGNAL and SECOND SIGNAL were symmetrical in their waveform. The general case, however, would more than likely involve some deviation from symmetry in the waveform of the FIRST SIGNAL while the SECOND SIGNAL would maintain its waveform symmetry. The justification for the latter assumption can be based on the fact that most processes involving a form of comparison impose a fixed quality and/or quantity to a contributing signal in order that it may serve as the basis for such comparison. It is in the manner in which the present invention inherently accomodates pulse-width variations occurring in the FIRST SIGNAL that makes said invention additionally unique and powerful. FIG. 5 shows that the null condition is represented by the fact that the central time axes of the FIRST SIGNAL and the SECOND SIGNAL are in coincidence. This alignment of the central time axes must take place regardless of the minor variations that occur in the pulse width of the FIRST SIGNAL if the previously defined null condition is to be preserved. To reiterate, the null condition is indicated by an output voltage of the preferred embodiment having a zero-volt dc component, and, in the case of the alternate embodiment, an output having an average digital count of zero. This correlation of the null condition with the alignment of the central time axes of the FIRST SIGNAL and the SECOND SIGNAL leads to an entirely new technique of coherent pulse-width demodulation which is discussed in the treatment of one application of the present invention.

Although not specifically mentioned in the description of the operation wherein both the FIRST SIGNAL and the SECOND SIGNAL were assumed to be symmetrical in their waveform, the correlation of the null condition with the alignment of the central time axes of the FIRST SIGNAL and the SECOND SIGNAL as described in the preceding paragraph shall be considered basic in the premise of this invention.

Figure 6:
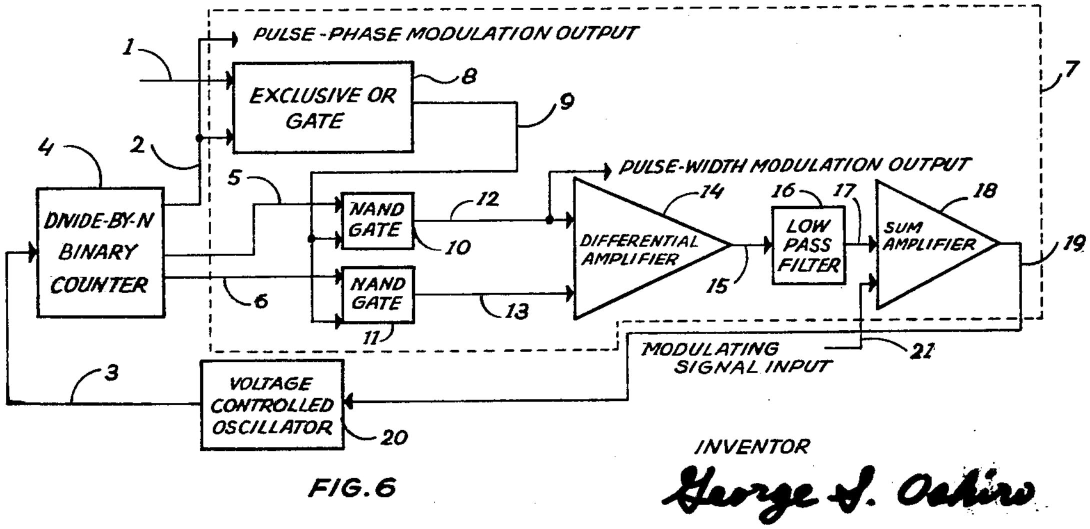
FIG. 6 is a schematic diagram illustrating one way in which the unique advantages of this invention, in the form of the preferred embodiment, are fully utilized in a phase-lock loop.

FIG. 6 illustrates in schematic form one application of the preferred embodiment of this invention. In this application, the present invention performs the function of the pulse-phase comparator 7 in a unique phase-lock loop which is extremely versatile in its capability of providing diverse modes of operation. If the said FIRST SIGNAL 1 is treated as the input pulse train and the MODULATING SIGNAL INPUT 21 is electrically grounded or left open-circuited, the said phase-lock loop has the ability, with substantial noise immunity, to demodulate said train of pulses in terms of frequency, phase or pulse width. If the FIRST SIGNAL comprises a symmetrical, fixed-frequency pulse train and the MODULATING SIGNAL INPUT comprises a varying analog signal, then the said phase-lock loop has the ability to coherently modulate, simultaneously, an output pulse train in terms of phase and another output pulse train in terms of pulse width. When the aforementioned phase-lock loop is used as a demodulator of the form described, the demodulated signal is representative of the original intelligence present in the input pulse train (FIRST SIGNAL) and is available at the low-pass filter output 17 or at the sum amplifier output 19. When the same phase-lock loop is utilized as a modulator, the modulated signals are representative of the varying analog signal (MODULATING SIGNAL INPUT) and are available as the PULSE-PHASE MODULATION OUTPUT at the output line 2 of the divide-by-n binary counter 4 and as the PULSE-WIDTH MODULATION OUTPUT at the output line 12 of the NAND gate 10. The mechanics of the operation characterizing the said phase-lock loop for obtaining pulse-phase or pulse-frequency demodulation is accented by a noticeable immunity to noise pulses or signal-jitter present on the same line as the FIRST SIGNAL by virtue of the mode of operation of the present invention as previously described. An excellent text covering phase-lock loops in the area of phase or frequency demodulation can be found in PHASELOCK TECHNIQUES by Floyd M. Gardner, published by John Wiley & Sons, Inc. The use of the phase-lock loop in demodulation of fixed-frequency, pulse-width-modulated pulse trains is, however, apparently unique within the art. In essence, pulse-width demodulation using a phase-lock loop constitutes the highest degree of coherent pulse-width demodulation possible. When coherency is coupled with the ability to time-division multiplex (as any signal of a pulse nature is capable of being multiplexed in time), the measure of the potential significance of the pulse-width demodulation technique described may be appreciated by those skilled in the art. The application of the above demodulation technique, without alteration in operation or construction, can be extended to the area of coherently detecting zero-crossing voltage points of an analog signal, provided that the analog signal is initially converted to pulses of the type defined herein before being inserted as an input to the said demodulator. The use of the phase-lock loop to achieve coherent pulse-width and pulse-phase modulation is also apparently unique within the art. An extension of the said modulation technique can be applied to analog-to-digital conversion areas since the generated pulse width corresponding to the applied analog signal in the manner already described can be used to activate a counter to count fixed, high frequency pulses, the number of which corresponds to the said pulse width.

In the case of the demodulator presented in the foregoing wherein a phase-lock loop utilizes the present invention, the operation can be briefly described as follows: Whenever the said phase comparator 7 detects a condition of misalignment (caused by the modulation present in the FIRST SIGNAL) of the central time axes of the FIRST SIGNAL 1 and the SECOND SIGNAL 2, it produces a corrective voltage which is fed into the voltage-controlled oscillator 20. The corrective voltage is representative of the pulse-width, pulse-frequency or pulse-phase modulation originally present as intelligence in said FIRST SIGNAL. The said voltage-controlled oscillator responds to the corrective voltage by modifying its frequency of oscillation in such a manner as to cause the central time axis of the SECOND SIGNAL to align itself to that of the FIRST SIGNAL by virtue of the closed loop. The said corrective voltage is effectively the replica of the said intelligence. In the case of the pulse-width or pulse-phase modulator previously mentioned, the insertion of a varying analog voltage in the form of the MODULATING SIGNAL INPUT 21 at the input to the sum amplifier 18 subsequently forces a shift in the frequency of oscillation of the said voltage-controlled oscillator in such a manner as to cause a misalignment of the said time axes. The extent of misalignment is proportional to the magnitude of the said varying analog voltage and is represented simultaneously by a varying pulse-phase signal in the form of PULSE-PHASE MODULATION OUTPUT 2 and by a fixed-frequency, varying pulse-width signal in the form of PULSE-WIDTH MODULATION OUTPUT 12. The said phase comparator detects the misalignment caused by the modulating signal and, by virtue of the closed loop, produces a substantially equivalent voltage output at line 17 of the low-pass filter 16 counteractive to the modulating signal.

It shall be recognized by those skilled in the art that the foregoing description of the present invention delineates certain unique and salient features which may be considered fundamental within the pertinent disciplines in which this invention can be used, and, as such, minor variations of the embodiments presented herein may come into being without departing from the broader scope and spirit of the appended claims.

What is claimed is:

1. A noise-free pulse-phase comparator comprising a first logic gating means responsive to a first input signal of variable phase and a second signal of reference phase for producing a series of output pulses whose pulse widths represent the phase difference between said first and second inputs; first and second complementary, externally-generated trains of pulses having a fundamental frequency a fixed integral multiple to said second input signal and a phase a fixed relation to said second input signal; second logic gating means connected and responsive to said series of output pulses and said first and second trains for producing first and second outputs representing the time coincidence of said output pulse series and respectively said first and second trains of pulses whereby the phase difference and the phase difference polarity of said first and second inputs are provided; and circuit means connected and responsive to said first and second outputs for producing a single output indicative of said phase difference and its said polarity.

2. A pulse-phase comparator as defined in claim 1 wherein said circuit means includes a bi-directional counter.

3. A pulse-phase comparator as defined in claim 1 wherein said first logic gating means comprises an EXCLUSIVE-OR gate and said second logic gating means comprises two NAND gates, said NAND gates connected and responsive to said series of output pulses, first of said NAND gates further connected and responsive to said first train, said first train comprising pulses whose positive-going edges coincide periodically with the positive-going edges of said second input signal, and second of said NAND gates further connected and responsive to said second train, said second train comprising pulses whose negative-going edges coincide periodically with the positive-going edges of said second input signal.

4. A pulse-phase comparator as defined in claim 1 wherein said first logic gating means comprises an EXCLUSIVE-NOR gate and said second logic gating means comprises two AND gates, said AND gates connected and responsive to said series of output pulses, first of said AND gates further connected and responsive to said first train, said first train comprising pulses whose positive-going edges coincide periodically with the positive-going edges of said second input signal, and second of said AND gates further connected and responsive to said second train, said second train comprising pulses whose negative-going edges coincide periodically with the positive-going edges of said second input signal.

5. A pulse-phase comparator as defined in claim 1 wherein said circuit means includes a differential amplifier.

6. A pulse-phase comparator as defined in claim 1 wherein said circuit means includes filtering means.

7. In the pulse-phase comparator of claim 3, the addition of inverting means connected and responsive to said first and second outputs from said NAND gates.

8. In the pulse-phase comparator of claim 4, the addition of inverting means connected and responsive to said first and second outputs from said AND gates.

* * * * *